United States Patent
Tanaka et al.

(10) Patent No.: US 11,983,951 B2
(45) Date of Patent: May 14, 2024

(54) HUMAN DETECTION DEVICE AND HUMAN DETECTION METHOD

(71) Applicant: OMRON Corporation, Kyoto (JP)

(72) Inventors: Kiyoaki Tanaka, Otsu (JP); Ayana Tsuji, Kusatsu (JP); Jumpei Matsunaga, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 457 days.

(21) Appl. No.: 17/294,810

(22) PCT Filed: Nov. 8, 2019

(86) PCT No.: PCT/JP2019/043977
§ 371 (c)(1),
(2) Date: May 18, 2021

(87) PCT Pub. No.: WO2020/137193
PCT Pub. Date: Jul. 2, 2020

(65) Prior Publication Data
US 2022/0004749 A1    Jan. 6, 2022

(30) Foreign Application Priority Data

Dec. 26, 2018   (JP) ................. 2018-243475

(51) Int. Cl.
*G06V 40/10*   (2022.01)
*G06F 18/21*   (2023.01)
(Continued)

(52) U.S. Cl.
CPC .......... *G06V 40/103* (2022.01); *G06F 18/217* (2023.01); *G06F 18/25* (2023.01); *G06V 20/52* (2022.01); *H04N 7/18* (2013.01)

(58) Field of Classification Search
CPC ...... G06V 40/103; G06V 40/10; G06V 20/52; G06F 18/217; G06F 18/25; H04N 7/18; H04N 7/188; G06T 7/00
See application file for complete search history.

(56) References Cited

U.S. PATENT DOCUMENTS

| | | | |
|---|---|---|---|
| 2014/0193034 A1* | 7/2014 | Oami | G06V 40/10 382/103 |
| 2015/0146010 A1* | 5/2015 | Yokozeki | G01S 3/7864 348/169 |

(Continued)

FOREIGN PATENT DOCUMENTS

| | | |
|---|---|---|
| CN | 1503194 A | 6/2004 |
| CN | 101561928 A | 10/2009 |

(Continued)

OTHER PUBLICATIONS

International Search Report issued in Intl. Appln. No. PCT/JP2019/043977 dated Feb. 4, 2020. English translation provided.

(Continued)

*Primary Examiner* — Edward F Urban
*Assistant Examiner* — Wassim Mahrouka
(74) *Attorney, Agent, or Firm* — ROSSI, KIMMS & McDOWELL LLP (57) ABSTRACT

A human detection device configured to analyze a fisheye image obtained by a fisheye camera installed above a to-be-detected area to detect a person existing in the to-be-detected area includes a head detector configured to detect at least one head candidate from the fisheye image by using an algorithm for detecting a human head, a human body detector configured to detect at least one human body candidate from the fisheye image by using an algorithm for detecting a human body, and a determining unit configured to determine, as a person, a pair satisfying a prescribed condition among pairs of the head candidate and the human body (Continued)

candidate formed of a combination of a detection result from the head detector and a detection result from the human body detector.

10 Claims, 8 Drawing Sheets

(51) Int. Cl.
  *G06F 18/25* (2023.01)
  *G06V 20/52* (2022.01)
  *H04N 7/18* (2006.01)

(56) References Cited

U.S. PATENT DOCUMENTS

| | | | | |
|---|---|---|---|---|
| 2016/0028951 | A1* | 1/2016 | Mayuzumi | G06V 40/20 |
| | | | | 348/36 |
| 2019/0130215 | A1* | 5/2019 | Kaestle | G06V 20/52 |
| 2019/0147598 | A1* | 5/2019 | Sawai | H04N 5/272 |
| | | | | 382/283 |
| 2019/0287212 | A1* | 9/2019 | Yanagisawa | H04N 23/61 |
| 2019/0378290 | A1* | 12/2019 | Yamaura | G06V 40/103 |

FOREIGN PATENT DOCUMENTS

| | | |
|---|---|---|
| CN | 101833791 A | 9/2010 |
| CN | 101866425 A | 10/2010 |
| CN | 101996401 A | 3/2011 |
| JP | H11261868 A | 9/1999 |
| JP | 2005351814 A * | 12/2005 |
| JP | 2005351814 A | 12/2005 |
| JP | 2016039539 A | 3/2016 |
| WO | 2013001941 A | 1/2013 |

OTHER PUBLICATIONS

Written Opinion issued in Intl. Appln. No. PCT/JP2019/043977 dated Feb. 4, 2020. English translation provided.
Office Action issued in Chinese Appln. No. 201980079319.9 dated Sep. 28, 2023. English translation provided.

* cited by examiner

| Areas given after division | Size ratio (head/human body) |
|---|---|
| L1,L2,L4,L5,L6,L10,L16,L20,L21,L22,L24,L25 | 0.17-0.25 |
| L3,L11,L15,L23 | 0.20-0.30 |
| L7,L9,L17,L19 | 0.25-0.35 |
| L8,L12,L14,L18 | 0.30-0.45 |
| L13 | 0.35-0.55 |

HUMAN DETECTION DEVICE AND HUMAN DETECTION METHOD

TECHNICAL FIELD

The present invention relates to a technique for detecting a person using an image captured by a fisheye camera.

BACKGROUND ART

The fields of building automation (BA) and factory automation (FA) require an application that automatically measures the "number", "position", "flow line", and the like of people using an image sensor and optimally control equipment such as lighting or air conditioner. In such an application, in order to acquire image information on as large an area as possible, an ultra-wide-angle camera equipped with a fisheye lens (referred to as a fisheye camera, an omnidirectional camera, or a 360-degree camera, each of which being of the same type, and the term "fisheye camera" is used herein) is often used.

An image taken by such a fisheye camera is highly distorted. Therefore, in order to detect a human body, a face, or the like from the image taken by the fisheye camera (hereinafter referred to as a "fisheye image"), a method under which the fisheye image is developed in a plane in advance to eliminate distortion as much as possible and then subjected to the detection processing is commonly used (see Patent Document 1).

PRIOR ART DOCUMENT

Patent Document

Patent Document 1: Japanese Unexamined Patent Publication No. 2016-39539

SUMMARY OF THE INVENTION

Problems to be Solved by the Invention

The related art, however, has the following problems. One of the problems is an increase in overall processing cost due to the preprocessing of developing the fisheye image in a plane. This makes real-time detection processing difficult and may lead to delays in device control, which is not preferable. The other problem is a risk of false detection due to significant deformation or division, caused by processing during the plane development, of an image of a person or object existing at a boundary (image break) at the time of plane development such as directly below the fisheye camera.

In order to avoid the problems, the present inventors have been studied an approach under which the fisheye image is subjected to the detection processing as it is (that is, "without plane development"). However, compared to an image taken by a normal camera, the fisheye image is large in variations of appearance of a to-be-detected person (an inclination, distortion, size of a human body), which makes detection difficult. In particular, when assuming an application such as BA or FA, there are many objects such as a chair, a personal computer, a trash can, an electric fan, and a circulator that tend to be misrecognized as a human body or head in the image, which leads to a reduction in detection accuracy.

The present invention has been made in view of the above-described circumstances, and it is therefore an object of the present invention to provide a technique for detecting a person from a fisheye image at high speed and with high accuracy.

Means for Solving the Problem

The present invention employs the following configuration in order to achieve the above-described object.

Provided according to a first aspect of the present invention is a human detection device configured to analyze a fisheye image obtained by a fisheye camera installed above a to-be-detected area to detect a person existing in the to-be-detected area, the human detection device including a head detector configured to detect at least one head candidate from the fisheye image by using an algorithm for detecting a human head, a human body detector configured to detect at least one human body candidate from the fisheye image by using an algorithm for detecting a human body, and a determining unit configured to determine, as a person, a pair satisfying a prescribed condition among pairs of the head candidate and the human body candidate formed of a combination of a detection result from the head detector and a detection result from the human body detector.

The "fisheye camera" is a camera that is equipped with a fisheye lens and is capable of taking an image with an ultra-wide angle as compared with a normal camera. Examples of the fisheye camera include an omnidirectional camera and a 360-degree camera. The fisheye camera may be installed to be directed downward from above the to-be-detected area. Typically, the fisheye camera is installed to have its optical axis directed vertically downward, but the optical axis of the fisheye camera may be inclined with respect to the vertical direction. The "algorithm for detecting a human head" and the "algorithm for detecting a human body" are different from each other in that the former is used only for detecting a head, and the latter is used only for detecting a human body. Herein, the "human body" may be the whole body of a person or the half body (such as an upper body, a head, or a torso).

According to the present invention, the fisheye image is not developed in a plane, which allows high-speed detection processing. Further, only when both the head and the body are detected from the image and satisfy a prescribed condition, the head and the body are determined to be a "person", which allows highly accurate detection.

The prescribed condition may include a condition with regard to relative positions of the head candidate and the human body candidate. The fisheye image obtained by the fisheye camera has a fixed law relating to a positional relationship between a head region and a human body region, which allows validity (probability of being a person) of the pair to be determined based on relative positions of the head region and the human body region. Specifically, the prescribed condition may include a condition that a region of the head candidate and a region of the human body candidate overlap each other. The prescribed condition may include a condition that the human body candidate is at coordinates closer to a center of the fisheye image than the head candidate.

The prescribed condition may include a condition with regard to relative sizes of the head candidate and the human body candidate. Sizes of a head and a human body in a fisheye image obtained by a fixed camera can be estimated in advance, which allows the validity (probability of being a person) of the pair to be determined based on the relative sizes of the head candidate and the human body candidate. Specifically, the prescribed condition may include a condition that a size ratio between the head candidate and the human body candidate falls within a prescribed range. The determining unit may change the prescribed range in accordance with coordinates, on the fisheye image, of the head candidate or the human body candidate.

The head detector may output detection reliability for each head candidate detected, the human body detector may output detection reliability for each human body candidate detected, and the prescribed condition may include a condition with regard to reliability of the head candidate and reliability of the human body candidate. This allows an increase in reliability of a final detection result, that is, an increase in detection accuracy.

For example, the determining unit may obtain total reliability based on the reliability of the head candidate and the reliability of the human body candidate, and the prescribed condition may include a condition that the total reliability is greater than a threshold. The total reliability may be any index as long as it is a function of the reliability of the head candidate and the reliability of the human body candidate. For example, the sum, simple average, or weighted average of the reliability of the head candidate and the reliability of the human body candidate may be used.

The determining unit may change a weight of the reliability of the head candidate and a weight of the reliability of the human body candidate for use in obtaining the total reliability in accordance with the coordinates, on the fisheye image, of the head candidate or the human body candidate. For example, in a case where a person is directly below the camera, the head appears, but, as for the human body, only both shoulders appear, which makes it difficult to detect the human body as compared with the head. As described above, which of the head candidate and the human body candidate tends to be higher in reliability changes in a manner that depends on the coordinates on the image, and it is therefore possible to increase the accuracy of the final determination with consideration given to the characteristic when obtaining the total reliability.

When either the reliability of the head candidate or the reliability of the human body candidate is high enough, the determining unit may make the condition with regard to the reliability of the other less restrictive. This is because when the reliability of one of the head candidate or the human body candidate is high enough, it is conceivable that the probability of being a person is high (even when the reliability of the detection of the other is a little low).

Provided according to a second aspect of the present invention is a human detection method for analyzing a fisheye image obtained by a fisheye camera installed above a to-be-detected area to detect a person existing in the to-be-detected area, the human detection method including the steps of detecting at least one head candidate from the fisheye image by using an algorithm for detecting a human head, detecting at least one human body candidate from the fisheye image by using an algorithm for detecting a human body, and determining, as a person, a pair satisfying a prescribed condition among pairs of the head candidate and the human body candidate formed of a combination of a detection result from the step of detecting at least one head candidate and a detection result from the step of detecting at least one human body candidate.

The present invention may be regarded as a person detection device including at least some of the above-described components, a person recognition device that recognizes (identifies) a detected person, a person tracking device that tracks a detected person, an image processing device, or a monitoring system. Further, the present invention may be regarded as a person detection method, a person recognition method, a person tracking method, an image processing method, or a monitoring method, each of which including at least some of the above-described processes. Further, the present invention may be regarded as a program for implementing such a method or a non-transitory recording medium that records the program. It should be noted that the above-described units and processing may be combined with each other to an allowable degree to form the present invention.

Effect of the Invention

According to the present invention, a person can be detected from a fisheye image at high speed and with high accuracy.

MODE FOR CARRYING OUT THE INVENTION

<Application Example>

Figure 1:
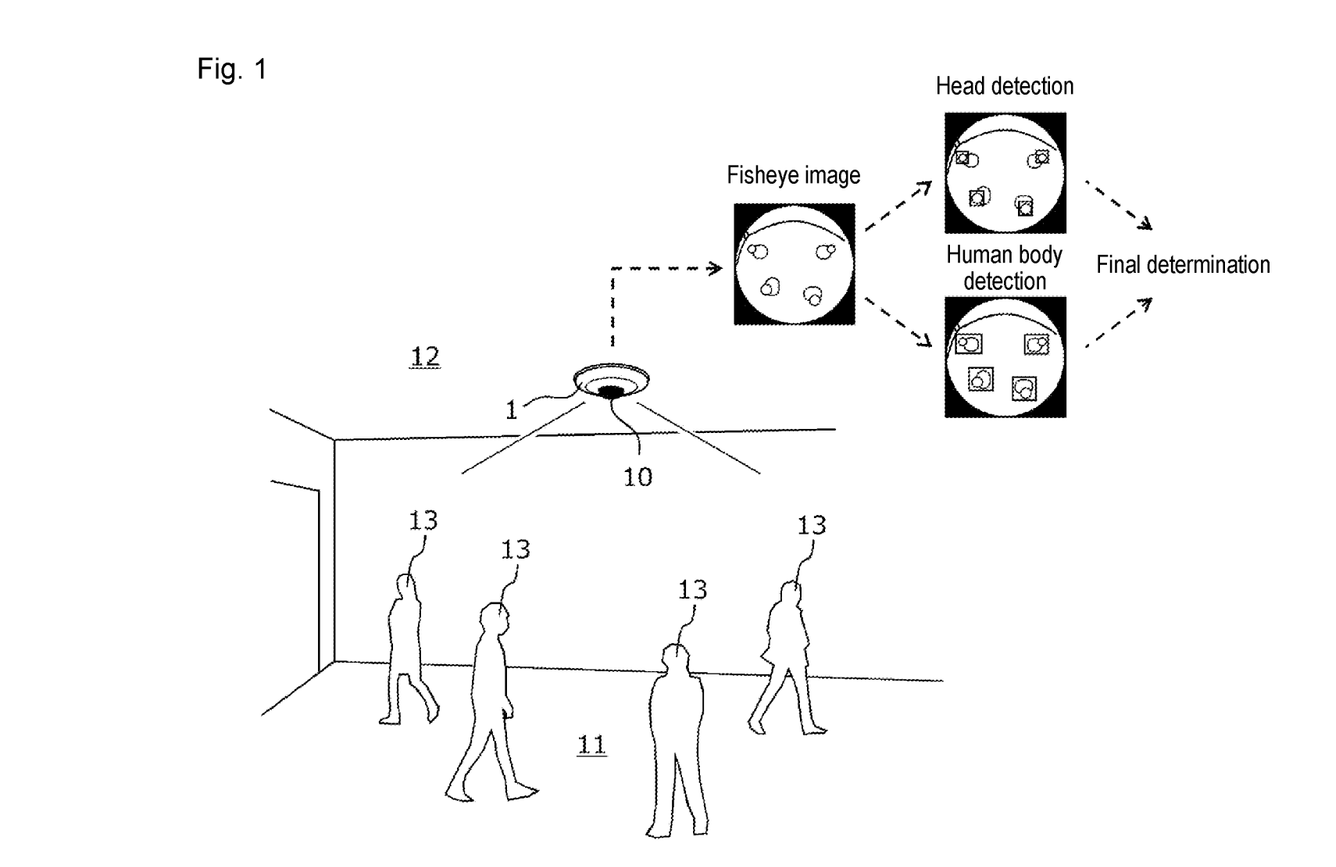
FIG. 1 is a diagram showing an application example of a human detection device according to the present invention.

A description will be given of an application example of a human detection device according to the present invention with reference to FIG. 1. A human detection device 1 analyzes a fisheye image obtained by a fisheye camera 10 installed above a to-be-detected area 11 (for example, on a ceiling 12) to detect a person 13 existing in the to-be-detected area 11. The human detection device 1 detects, recognizes, and tracks the person 13 passing through the to-be-detected area 11, for example, in an office or a factory. A detection result from the human detection device 1 is output to an external device for use in, for example, counting the number of people, controlling various devices such as lighting and air conditioner, and keeping a suspicious person under observation.

The human detection device 1 is characterized as being capable of using the fisheye image as it is (that is, without preprocessing such as plane development or elimination of distortion) for person detection processing. This allows high-speed detection processing (real-time performance). The human detection device 1 is further characterized as being capable of making head detection and human body detection on the fisheye image to make a final determination (determination as to whether it is a person) based on a combination of the result of the head detection and the result of the human body detection. At this time, pairing the head and the human body and evaluating reliability with consideration given to the characteristics of the fisheye image allows highly accurate detection.

<Monitoring System>

Figure 2:
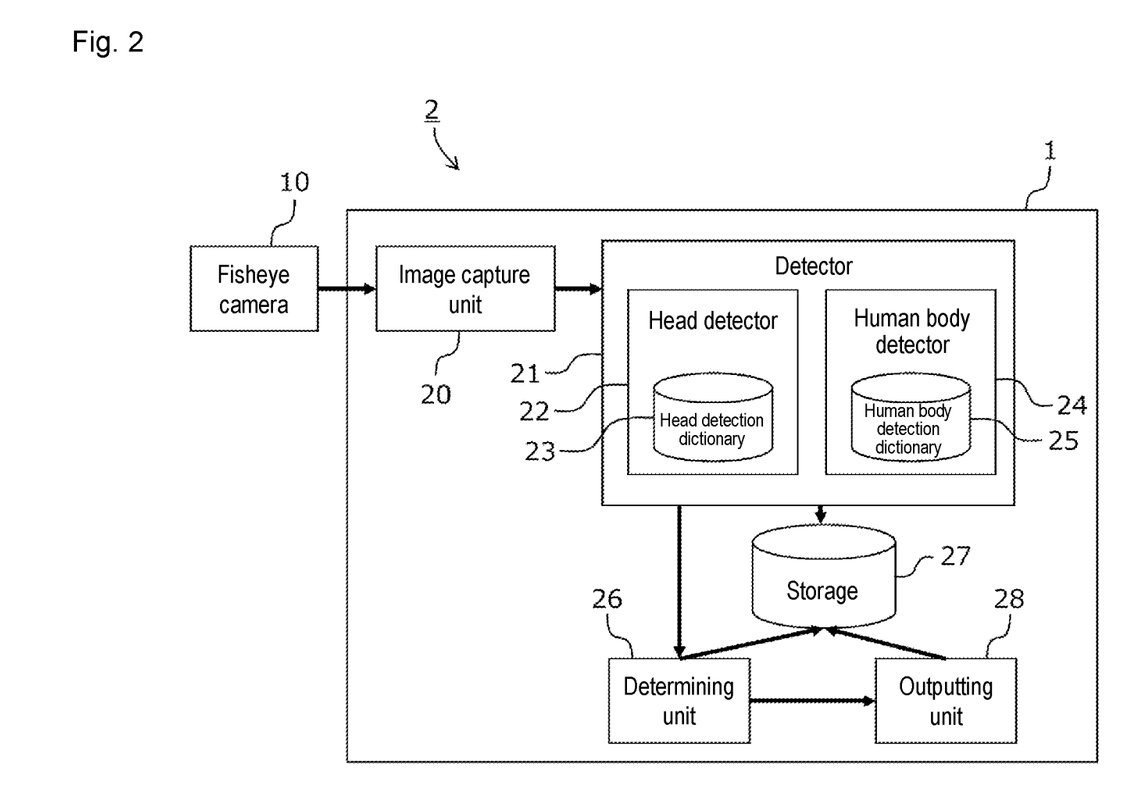
FIG. 2 is a diagram showing a structure of a monitoring system including the human detection device.

A description will be given of the embodiment of the present invention with reference to FIG. 2. FIG. 2 is a block diagram showing a structure of a monitoring system to which the human detection device according to the embodiment of the present invention is applied. A monitoring system 2 primarily includes the fisheye camera 10 and the human detection device 1.

The fisheye camera 10 is an imaging device including an optical system with a fisheye lens and an imaging element (an image sensor such as a CCD or CMOS). For example, as shown in FIG. 1, the fisheye camera 10 may be installed on, for example, the ceiling 12 of the to-be-detected area 11 with the optical axis directed vertically downward to take an omnidirectional (360-degree) image of the to-be-detected area 11. The fisheye camera 10 is connected to the human detection device 1 by wire (such as a USB cable or a LAN cable) or by radio (such as WiFi), and the human detection device 1 captures image data taken by the fisheye camera 10. The image data may be either a monochrome image or a color image, and the resolution, frame rate, and format of the image data are determined as desired. According to the embodiment, it is assumed that a monochrome image captured at 10 fps (10 images per second) is used.

Figure 3:
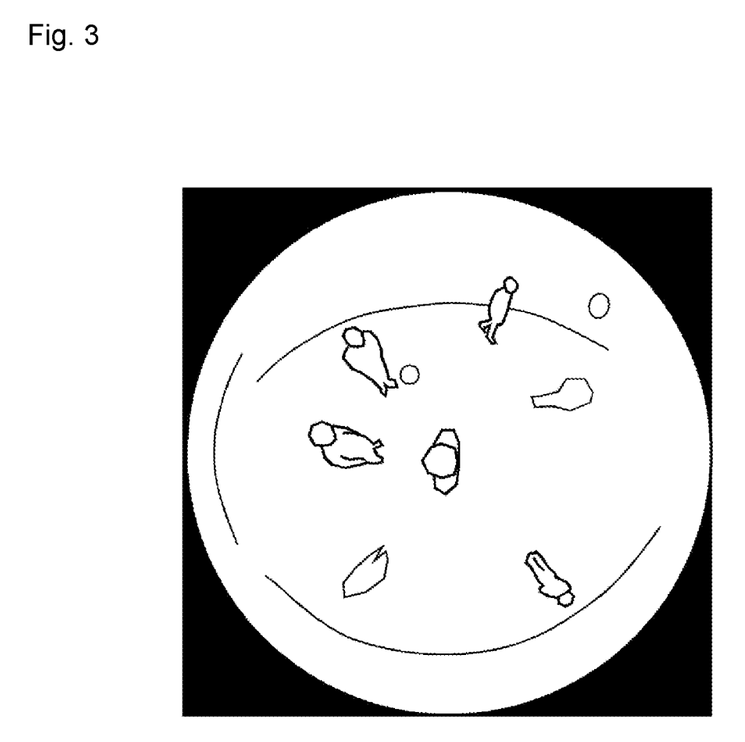
FIG. 3 is a diagram showing an example of a fisheye image.

FIG. 3 shows an example of the fisheye image captured from the fisheye camera 10. When the fisheye camera 10 is installed with an optical axis directed vertically downward, an image, in top view, of a person located directly below the fisheye camera 10 appears in a center of the fisheye image. Then, an angle of depression becomes smaller toward an edge of the fisheye image, and an image of the person appears in top oblique view. Further, the center of the fisheye image is less prone to distortion, and image distortion increases toward the edge of the fisheye image. As described in BACKGROUND ART, in the related art, a plane-developed image that results from eliminating distortion from the fisheye image is created, and then image processing such as detection or recognition is executed, but the monitoring system 2 according to the embodiment executes detection or recognition processing on the fisheye image left as it is (left distorted) as shown in FIG. 3. This eliminates the need for preprocessing such as elimination of distortion and thus allows real-time monitoring.

Returning to FIG. 2, a description will be given of the human detection device 1. The human detection device 1 according to the embodiment includes an image capture unit 20, a head detector 22, a human body detector 24, a determining unit 26, a storage 27, and an outputting unit 28. The head detector 22 and the human body detector 24 are also collectively referred to as a "detector 21". The image capture unit 20 has a capability of capturing the image data from the fisheye camera 10. The image data thus captured is stored in the storage 27. The head detector 22 has a capability of detecting a head candidate from the fisheye image by using an algorithm for detecting a human head. A head detection dictionary 23 is a dictionary in which image features of heads appearing in the fisheye image are registered in advance. The human body detector 24 has a capability of detecting a human body candidate from the fisheye image by using an algorithm for detecting a human body. A human body detection dictionary 25 is a dictionary in which image features of human bodies appearing in the fisheye image are registered in advance. The determining unit 26 has a capability of determining whether it is a "person" existing in the fisheye image based on the detection result from the head detector 22 and the detection result from the human body detector 24. The storage 27 has a capability of storing the fisheye image, the detection result, the determination result, and the like. The outputting unit 28 has a capability of outputting information such as the fisheye image, the detection result, or the determination result to an external device. For example, the outputting unit 28 may display information on a display serving as the external device, transfer information to a computer serving as the external device, or send information or a control signal to a lighting device, an air conditioner, or an FA device serving as the external device.

The human detection device 1 may be, for example, a computer including a CPU (processor), a memory, a storage, and the like. This causes the structure shown in FIG. 2 to be implemented by loading a program stored in the storage into the memory and executing the program by the CPU. Such a computer may be a general-purpose computer such as a personal computer, a server computer, a tablet terminal, or a smartphone, or alternatively, an embedded computer such as an onboard computer. Alternatively, all or part of the structure shown in FIG. 2 may be implemented by an ASIC, an FPGA, or the like. Alternatively, all or part of the structure shown in FIG. 2 may be implemented by cloud computing or distributed computing.

<Person Detection Processing>

Figure 4:
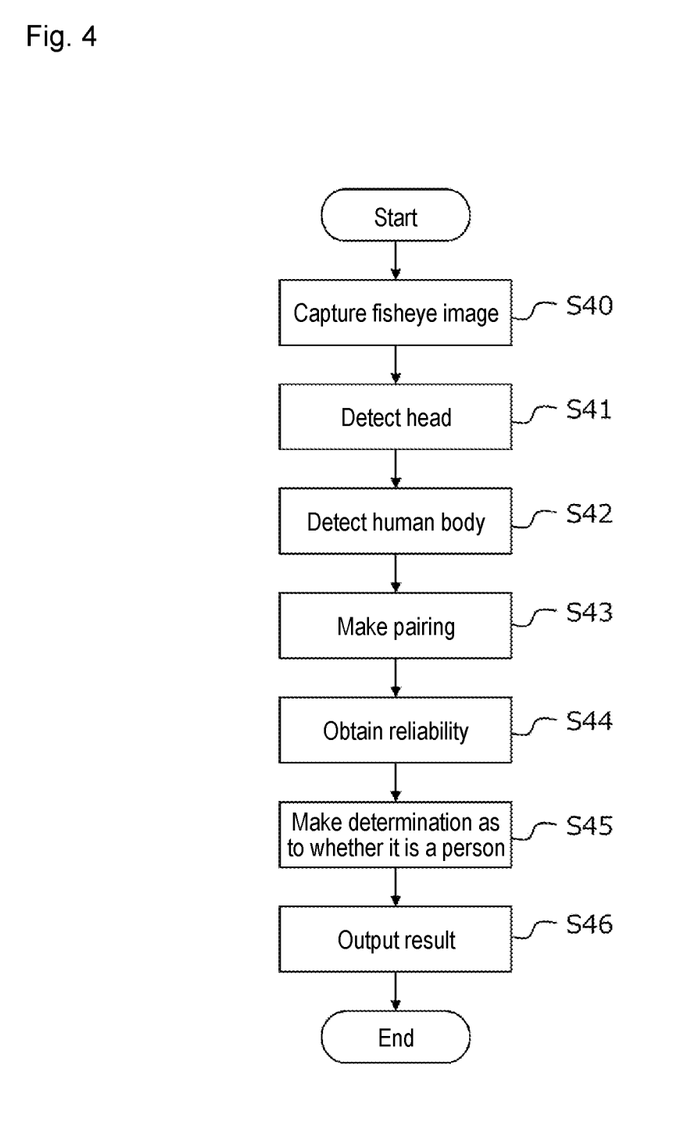
FIG. 4 is a flowchart of human detection processing.

FIG. 4 is a flowchart of the person detection processing to be executed by the monitoring system 2. A description will be given of an overall flow of the person detection processing with reference to FIG. 4. Note that the flowchart shown in FIG. 4 shows processing on the fisheye image for one frame. When the fisheye image is captured at 10 fps, the processing shown in FIG. 4 is executed 10 times per second.

First, the image capture unit 20 captures the fisheye image for one frame from the fisheye camera 10 (step S40). FIG. 3 is an example of the fisheye image thus captured. Five people appear in the fisheye image.

Figure 5:
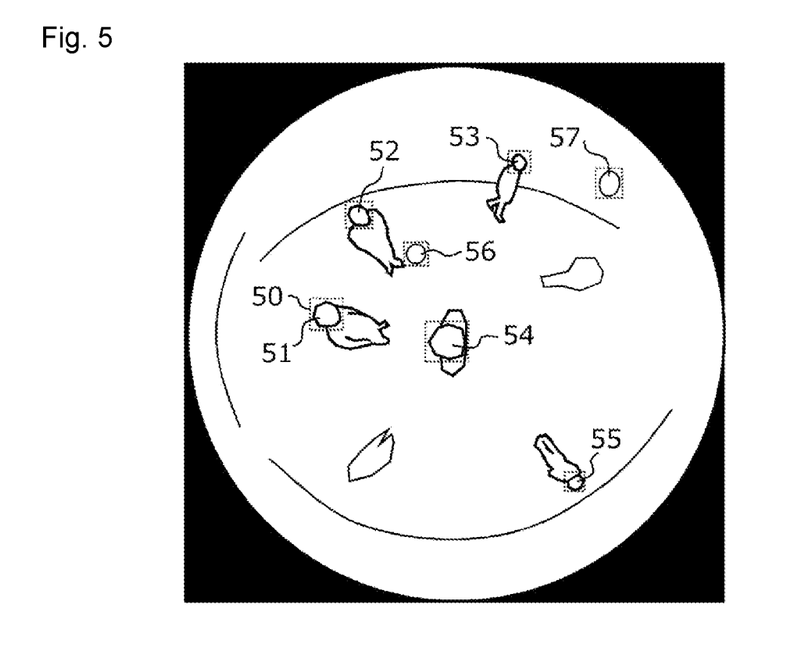
FIG. 5 is a diagram showing an example of a result of head detection.

Next, the head detector 22 detects a human head from the fisheye image (step S41). When a number of people exist in the fisheye image, a number of human heads are detected. Further, in many cases, a non-head object (such as a ball, a personal computer, a circulator, or a round chair that resembles a human head in shape or color) may be falsely detected. The detection result from the head detector 22 may contain such a non-head object;

therefore, the detection result is referred to as a "head candidate" at this stage. The detection result may contain, for example, a tangential quadrilateral (also referred to as a "bounding box") of the head candidate thus detected and detection reliability (probability of being a head). FIG. 5 is an example of the result of the head detection. A reference numeral 50 denotes the bounding box.

In this example, in addition to human heads 51, 52, 53, 54, 55, non-head objects 56, 57 have also been detected as head candidates. Note that any algorithm may be applied to the head detection. For example, a classifier that is a combination of image features such as HoG or Haar-like and Boosting may be applied, or head recognition based on deep learning (for example, R-CNN, Fast R-CNN, YOLO, SSD, or the like) may be applied.

Figure 6:
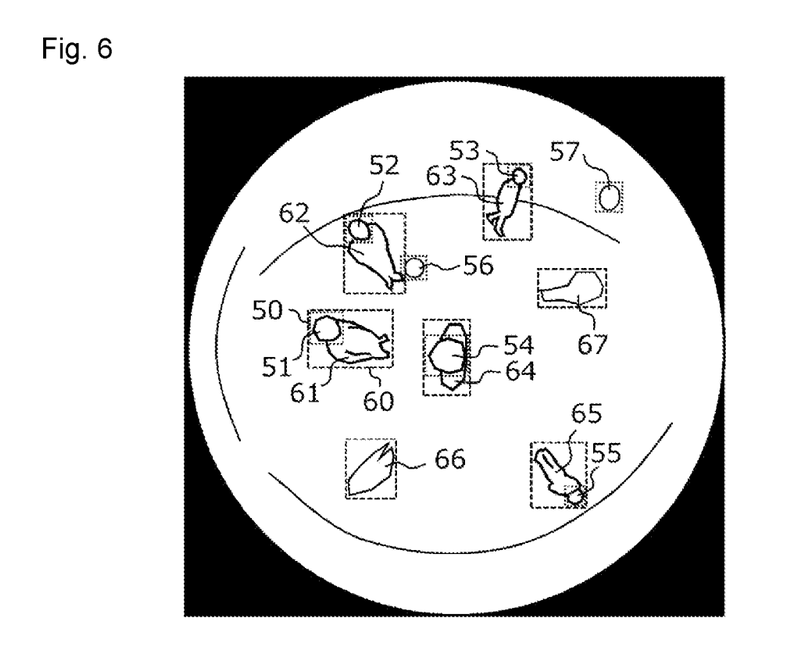
FIG. 6 is a diagram showing an example where a result of human body detection is superimposed on the result of head detection.

Next, the human body detector 24 detects a human body from the fisheye image (step S42). When a number of people exist in the fisheye image, a number of human bodies are detected. Further, in many cases, a non-human body object (such as an electric fan, a desk chair, or a coat rack that resembles a human body in shape or color) may be falsely detected. The detection result from the human body detector 24 may contain such a non-human body object; therefore, the detection result is referred to as a "human body candidate" at this stage. The detection result may contain, for example, a tangential quadrilateral (also referred to as a "bounding box") of the human body candidate thus detected and detection reliability (probability of being a human body). FIG. 6 is a diagram showing an example where the result of the human body detection is superimposed on the result of the head detection. A reference numeral 60 denotes the bounding box of the human body candidate. In this example, in addition to human bodies 61, 62, 63, 64, 65, non-human body objects 66, 67 have also been detected as human body candidates. Note that any algorithm may be applied to the human body detection. For example, a classifier that is a combination of image features such as HoG or Haar-like and Boosting may be applied, or human body recognition based on deep learning (for example, R-CNN, Fast R-CNN, YOLO, SSD, or the like) may be applied. According to the embodiment, the whole body of a person is detected as a human body, but the present invention is not limited to such detection, and part of the body such as the upper body may be detected.

Note that the head detection and the human body detection are made independently of each other, allowing the human body detection and the head detection to be sequentially made in this order, or allowing the head detection and the human body detection to be made in parallel.

Next, the determining unit 26 pairs the head candidate and the human body candidate (step S43). For example, the determining unit 26 selects, from 49 pairs of seven head candidates 51 to 57 and seven human body candidates 61 to 67 shown in FIG. 6, only a pair satisfying a prescribed pairing condition. The details of the pairing condition and the pairing processing will be described later.

Next, the determining unit 26 obtains reliability of each pair obtained in step S43 (step S44). The reliability of the pair is a degree of likelihood that the pair (the head candidate and the human body candidate) indicates an actual human head and body (probability of being a person). The details of the reliability will be described later.

Figure 7:
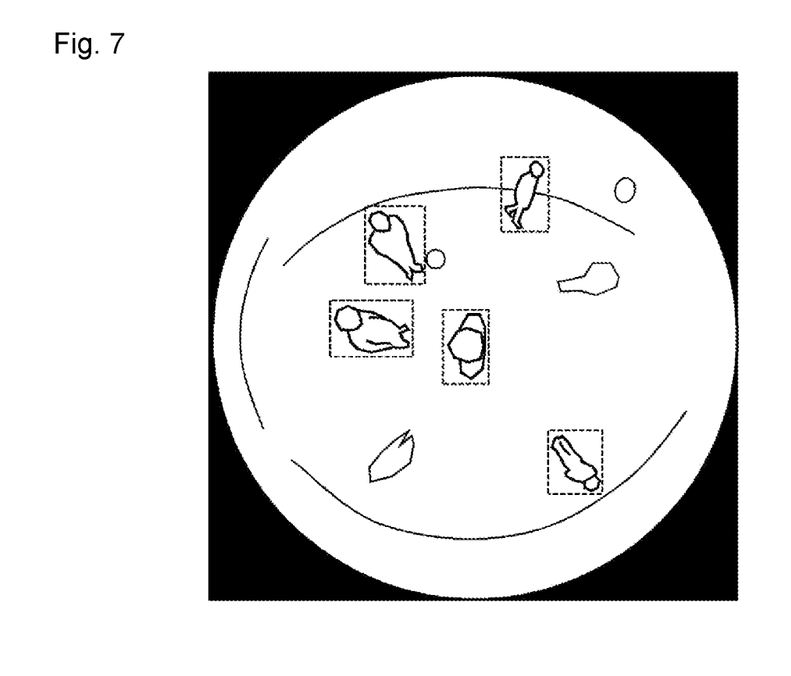
FIG. 7 is a diagram showing an example of a final determination result (person detection result).

Next, the determining unit 26 extracts, from a plurality of the pairs obtained in step S43, only a pair satisfying a prescribed reliability condition (step S45). Then, the determining unit 26 finally determines that the pair (the combination of the head candidate and the human body candidate) thus extracted is a "person" and stores the determination result in the storage 27. The determination result may contain, for example, information such as the position and size of the tangential quadrilateral (bounding box) surrounding the head candidate and the human body candidate, the reliability of the pair, and the like. FIG. 7 is an example of the final determination result (person detection result).

Finally, the outputting unit 28 outputs the determination result obtained in step S45 to the external device (step S46). This is the end of the processing on the fisheye image for one frame.

In the person detection processing according to the embodiment, the fisheye image is analyzed as it is, and a person is detected directly from the fisheye image. This eliminates the need for preprocessing such as the plane development of the fisheye image or the elimination of distortion from the fisheye image, which allows high-speed person detection processing. The method under which the fisheye image is used as it is for the detection processing has a disadvantage that the method is lower in detection accuracy than the method under which the detection processing is executed after the plane development (the elimination of distortion); however, according to the embodiment, logic is employed, under which both the head and the human body are detected from the fisheye image, and when satisfying a prescribed condition, the head and the human body are determined to be a "person", which allows detection to be made with significantly high accuracy.

Note that, according to the embodiment, two conditions, the pairing condition and the reliability condition, are used as the prescribed conditions, but when only either one of the conditions can ensure sufficient accuracy, the condition may be used alone. Alternatively, a condition other than the pairing condition or the reliability condition may be used.

<Pairing>

A description will be given of a specific example of the pairing processing executed by the determining unit 26 and the pairing condition.

(1) Pairing Based on Relative Position

Since the fisheye image is taken at an angle to be a bird's-eye view of a person, a head region (bounding box) and a human body region (bounding box) overlap each other as shown in FIG. 6. Further, when a person is directly below the camera (that is, on the optical axis), the center of the head region and the center of the human body region approximately coincide with each other, but when a person is at another position, the human body region appears close to the center of the image as compared with the head region (in other words, when viewed from the center of the image, the center of the human body region and the center of the head region are arranged in this order). The use of such characteristics of the fisheye image allows, with consideration given to relative positions of the head region and the human body region, the validity of the combination of the head candidate and the human body candidate to be evaluated.

Figure 8:
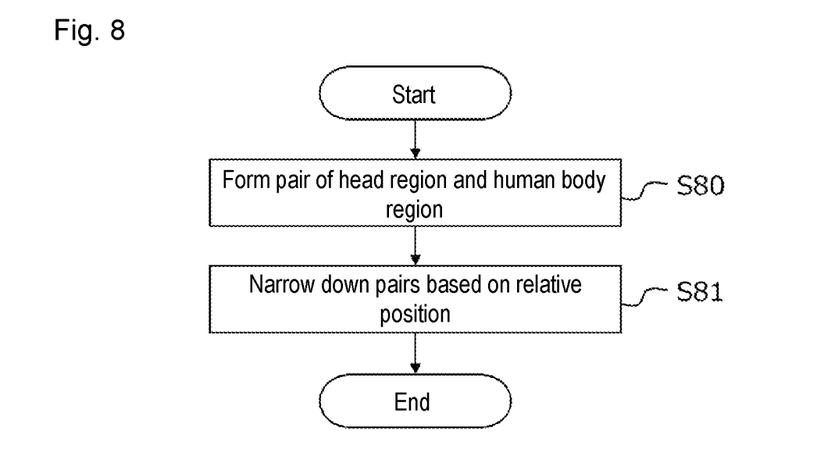
FIG. 8 is a flowchart of pairing processing based on a relative position.

FIG. 8 is a flowchart of pairing processing based on the relative position. First, the determining unit 26 forms, from all the combinations of the head candidates and the human body candidates, a pair having the head region and the human body region overlapping each other (step S80). In the example shown in FIG. 6, six pairs are formed. The reason why the number of the pairs is larger than the actual number of people (five people) is because a pair of the human body candidate 62 and the head candidate 56 that is a result of false detection is also formed.

Next, the determining unit 26 determines which of the head region and the human body region is closer to the center of the image for each of the pairs obtained in step S80 and extracts only a pair having the human body region closer to the center of the image than the head region (step S81). This determination may be made, for example, based on a comparison of a distance between the center of the head region and the center of the image with a distance between the center of the human body region and the center of the image. Such processing allows the pair of the human body candidate 62 and the head candidate 56 to be eliminated. As a result, the pairs are narrowed down to five pairs of the head candidate 51 and the human body candidate 61, the head candidate 52 and the human body candidate 62, the head candidate 53 and the human body candidate 63, the head candidate 54 and the human body candidate 64, and the head candidate 55 and the human body candidate 65.

(2) Pairing Based on Relative Size

When the fisheye camera 10 has its position fixed relative to the to-be-detected area, the size of the head or human body on the fisheye image is generally predictable. Further, calculating relative sizes of the head and the human body allows variations in body size among individuals to be canceled. The use of such characteristics of the fisheye image allows, with consideration given to the relative sizes of the head region and the human body region, the validity of the combination of the head candidate and the human body candidate to be evaluated.

Figure 9:
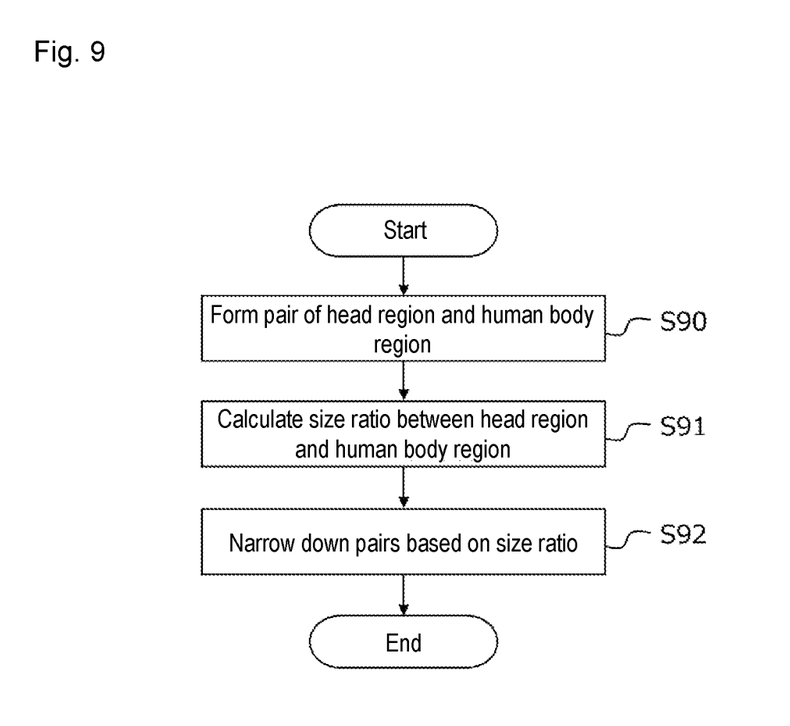
FIG. 9 is a flowchart of pairing processing based on a relative size.

FIG. 9 is a flowchart of pairing processing based on the relative size. First, the determining unit 26 forms, from all the combinations of the head candidates and the human body candidates, a pair having the head region and the human body region overlapping each other (step S90). This process is the same as step S80 shown in FIG. 8. Next, the determining unit 26 calculates a size ratio between the head region and the human body region for each of the pairs obtained in step S90 (step S91). For example, an area ratio between the bounding boxes may be obtained as the size ratio, or a ratio between lengths of sides or diagonals may be obtained as the size ratio. Then, the determining unit 26 extracts only a pair having the size ratio falling within a prescribed range (step S92). Such processing allows an object that is a result of false detection and is clearly different in size from an actual head or human body to be eliminated from to-be-paired objects.

Figure 10:
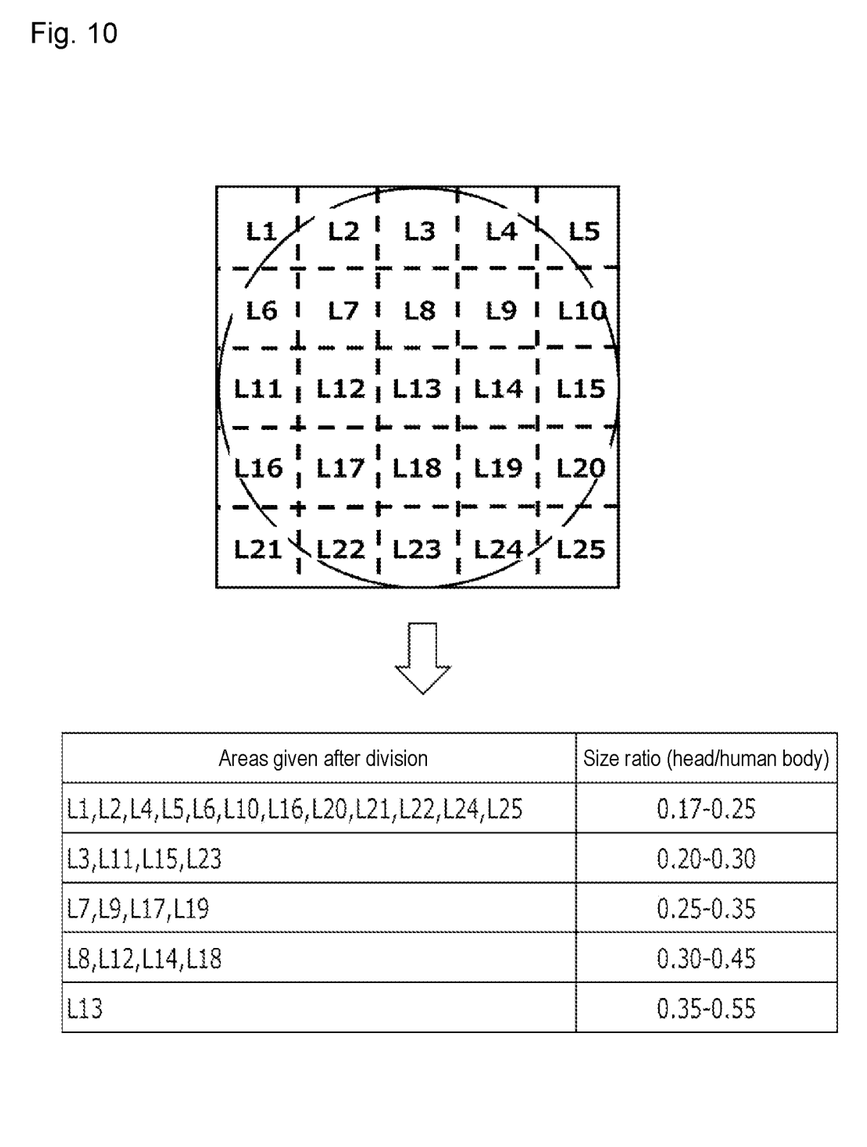
FIG. 10 is a diagram showing an example where processing is changed in accordance with a position on an image.

In the meantime, the fisheye image has a characteristic by which an angle of depression becomes smaller toward an edge of the image, and the human body region becomes relatively larger in size than the head region. That is, the size ratio between the head region and the human body region is not constant across the image and may change in a manner that depends on a position in the fisheye image. Therefore, the determining unit 26 may make the "prescribed range" used in step S92 variable in a manner that depends on coordinates, on the image, of the head candidate or the human body candidate. For example, as shown in FIG. 10, the fisheye image is divided into 25 areas L1 to L25, and a correct range of the size ratio is set for each of the areas given after the division. In the example shown in FIG. 10, the correct range is set to make the size ratio (head region/human body region) smaller as the distance from the center of the image increases. The determining unit 26 can make, in the determination process in step S92, an appropriate determination based on the position in the fisheye image by consulting a table as shown in FIG. 10. This allows a further increase in reliability of pairing.

<Reliability>

A description will be given of some specific examples of reliability determination made by the determining unit 26.

(1) Individual Determination

The determining unit 26 may determine that, when a head candidate and a human body candidate forming a pair are each greater in reliability than a corresponding prescribed threshold, the pair is a person. That is, the individual determination is made by the following method:

with reliability of the head candidate denoted by Ch, reliability of the human body candidate denoted by Cb, a threshold of the head candidate denoted by Th, and a threshold of the human body candidate denoted by Tb, when Ch>Th and Cb>Tb are satisfied, it is determined to be a "person", and when Ch Th or Cb Tb is satisfied, it is determined to be not a "person".

(2) Simple Averaging

The determining unit 26 may obtain total reliability Cw based on the reliability Ch of the head candidate and the reliability Cb of the human body candidate and determine whether the pair is a person based on a result of a determination as to whether the total reliability Cw is greater than a threshold Tw.

In the simple averaging, the total reliability Cw may be calculated by the following equation:

$$Cw=(Ch+Cb)/2$$

(3) Weighted Averaging

In the weighted averaging, the total reliability Cw may be calculated by, for example, the following equation:

$$Cw=(w \times Ch+(1-w) \times Cb)/2.$$

Where w denotes a weight. The weight w may be a fixed value or may vary in a manner that depends on the coordinates, on the fisheye image, of the head candidate or the human body candidate. As shown in FIG. 6, in the center of the image, the head appears large, but the human body almost disappear. The human body appears larger toward the edge of the image. With consideration given to such characteristics of the fisheye image, it is desirable that the weight w of the reliability Ch of the head candidate be made relatively large in the center of the image, and the weight (1−w) of the reliability Cb of the human body candidate be made larger toward the edge of the image.

(4) With Higher Priority Given to Head

When the reliability Ch of the head candidate is significantly high, the determining unit 26 may make a final determination as to whether it is a person with no consideration given to the reliability Cb of the human body candidate (or with the weight of the reliability Cb of the human body candidate made significantly small). Furthermore, when the reliability Ch of the head candidate is significantly high, the head candidate may be determined to be a "person" even when the human body candidate to be paired with the head candidate has not been found (it is assumed that the probability of the human body being hidden by an object is high). Note that it is preferable that the threshold used in determination as to whether the reliability Ch is significantly high be made greater than the above-described Th, Tw.

(5) With Higher Priority Given to Human Body

When the reliability Cb of the human body candidate is significantly high, the determining unit 26 may make a final determination as to whether it is a person with no consideration given to the reliability Ch of the head candidate (or with the weight of the reliability Ch of the head candidate made significantly small). Furthermore, when the reliability Cb of the human body candidate is significantly high, the human body candidate may be determined to be a "person" even when the head candidate to be paired with the human body candidate has not been found (it is assumed that the probability of the head being hidden by an object is high). Note that it is preferable that the threshold used in determination as to whether the reliability Cb is significantly high be made greater than the above-described Tb, Tw.

<Others>

The above-described embodiment is merely illustrative of a configuration example according to the present invention. The present invention is not limited to the above-described specific forms, and various modifications may be made within the scope of the technical idea of the present invention.

APPENDIX 1

(1) A human detection device (1) configured to analyze a fisheye image obtained by a fisheye camera (10) installed above a to-be-detected area (11) to detect a person (13) existing in the to-be-detected area (11), the human detection device (1) including:
  a head detector (22) configured to detect at least one head candidate from the fisheye image by using an algorithm for detecting a human head;
  a human body detector (24) configured to detect at least one human body candidate from the fisheye image by using an algorithm for detecting a human body; and
  a determining unit (26) configured to determine, as a person, a pair satisfying a prescribed condition among pairs of the head candidate and the human body candidate formed of a combination of a detection result from the head detector (22) and a detection result from the human body detector (24).

(2) A human detection method for analyzing a fisheye image obtained by a fisheye camera (10) installed above a to-be-detected area (11) to detect a person (13) existing in the to-be-detected area (11), the human detection method including the steps of:
  detecting at least one head candidate from the fisheye image by using an algorithm for detecting a human head (S41);
  detecting at least one human body candidate from the fisheye image by using an algorithm for detecting a human body (S42); and
  determining, as a person, a pair satisfying a prescribed condition among pairs of the head candidate and the human body candidate formed of a combination of a detection result from the step of detecting at least one head candidate and a detection result from the step of detecting at least one human body candidate (S45).

DESCRIPTION OF SYMBOLS 1 human detection device
2 monitoring system
10 fisheye camera
11 to-be-detected area
12 ceiling
13 person

The invention claimed is:

1. A monitoring system that detects a person existing in a to-be-detected area, the monitoring system comprising:
  a fisheye camera installed above the to-be-detected area; and
  (i) a least one memory configured to store computer-executable instructions and at least one processor configured to execute the computer-executable instructions stored in the at least one memory, (ii) at least one integrated circuit, or both (i) and (ii) that implement:
  an obtainer configured to obtain a fisheye image of the to-be-detected area taken by the fisheye camera;
  a head detector configured to detect at least one head candidate from the fisheye image by using an algorithm for detecting a human head and to output a detection reliability for each head candidate detected;
  a human body detector configured to detect at least one human body candidate from the fisheye image by using an algorithm for detecting a human body and to output a detection reliability for each human body candidate detected; and
  a determining unit configured to determine, as a person, a pair satisfying a prescribed condition among pairs of the head candidate and the human body candidate formed of a combination of a detection result from the head detector and a detection result from the human body detector, wherein
  the prescribed condition comprises a condition that a total reliability is greater than a threshold, the total reliability being obtained based on the reliability of the head candidate and the reliability of the human body candidate, and
  the determining unit changes a weight of the reliability of the head candidate and a weight of the reliability of the human body candidate for use in obtaining the total reliability in accordance with the coordinates, on the fisheye image, of the head candidate or the human body candidate.

2. The monitoring system according to claim 1, wherein the prescribed condition comprises a condition with regard to relative positions of the head candidate and the human body candidate.

3. The monitoring system according to claim 1, wherein the prescribed condition comprises a condition that a region of the head candidate and a region of the human body candidate overlap each other.

4. The monitoring system according to claim 1, wherein the prescribed condition comprises a condition that the human body candidate is at coordinates closer to a center of the fisheye image than the head candidate.

5. The monitoring system according to claim 1, wherein the prescribed condition comprises a condition with regard to relative sizes of the head candidate and the human body candidate.

6. The monitoring system according to claim 1, wherein the prescribed condition comprises a condition that a size ratio between the head candidate and the human body candidate falls within a prescribed range.

7. The monitoring system according to claim 6, wherein the determining unit changes the prescribed range in accordance with coordinates, on the fisheye image, of the head candidate or the human body candidate.

8. The monitoring system according to claim 1, wherein when either the reliability of the head candidate or the reliability of the human body candidate is high enough, the determining unit makes the condition with regard to the reliability of the other less restrictive.

9. A control method for a monitoring system that detects a person existing in a to-be-detected area and that includes a fisheye camera installed above the to-be-detected area, the control method comprising:
  obtaining a fisheye image of the to-be-detected area taken by the fisheye camera;
  detecting at least one head candidate from the fisheye image by using an algorithm for detecting a human head and outputting a detection reliability for each head candidate detected;
  detecting at least one human body candidate from the fisheye image by using an algorithm for detecting a human body and outputting a detection reliability for each human body candidate detected; and
  determining, as a person, a pair satisfying a prescribed condition among pairs of the head candidate and the human body candidate formed of a combination of a detection result from the step of detecting at least one head candidate and a detection result from the step of detecting at least one human body candidate, wherein
  the prescribed condition comprises a condition that a total reliability is greater than a threshold, the total reliability being obtained based on the reliability of the head candidate and the reliability of the human body candidate, and in the determining, a weight of the reliability of the head candidate and a weight of the reliability of the human body candidate for use in obtaining the total reliability is changed in accordance with the coordinates, on the fisheye image, of the head candidate or the human body candidate.

10. A non-transitory computer readable medium storing a program for causing a computer to execute the control method according to claim 9.

* * * * *